UNITED STATES PATENT OFFICE.

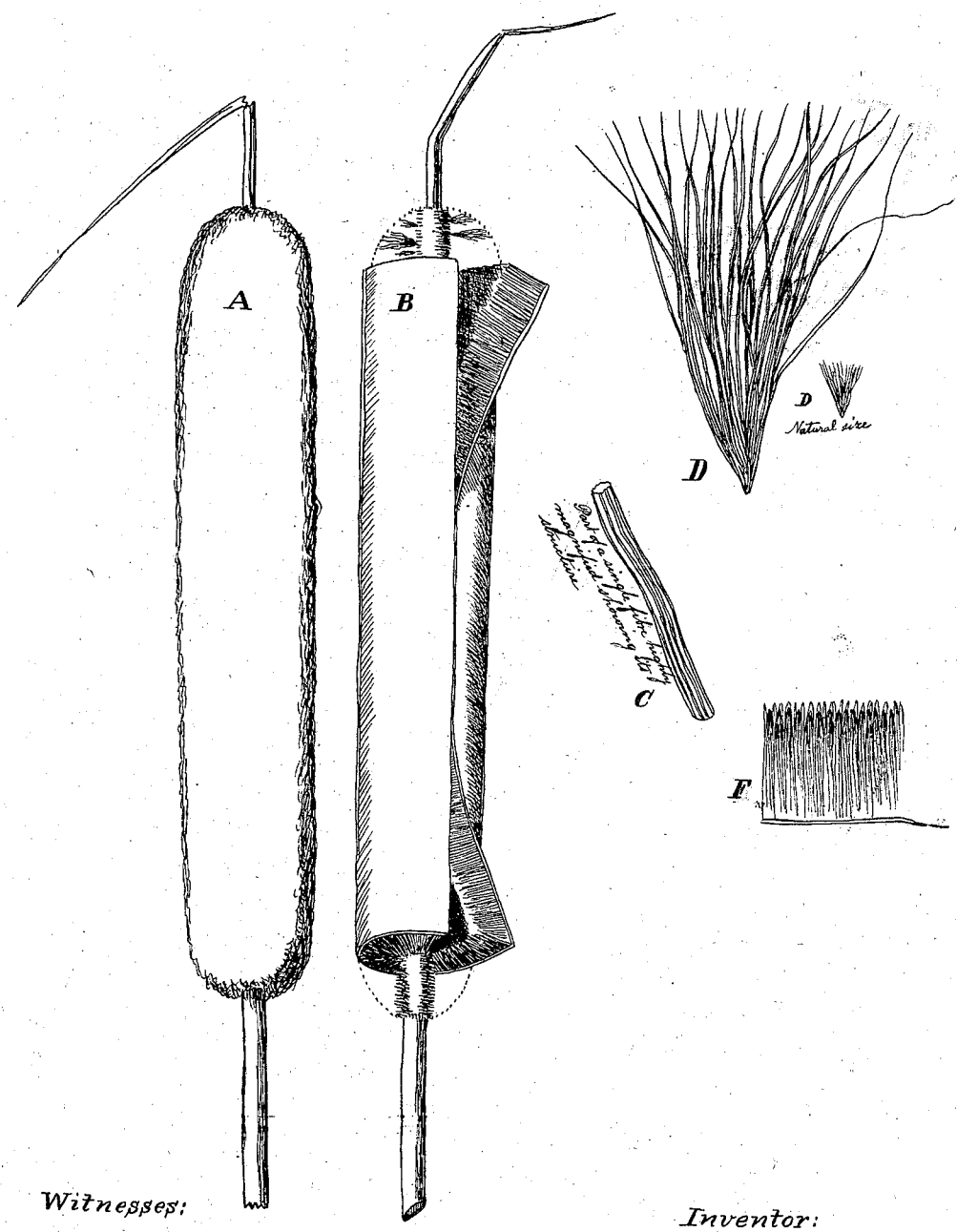

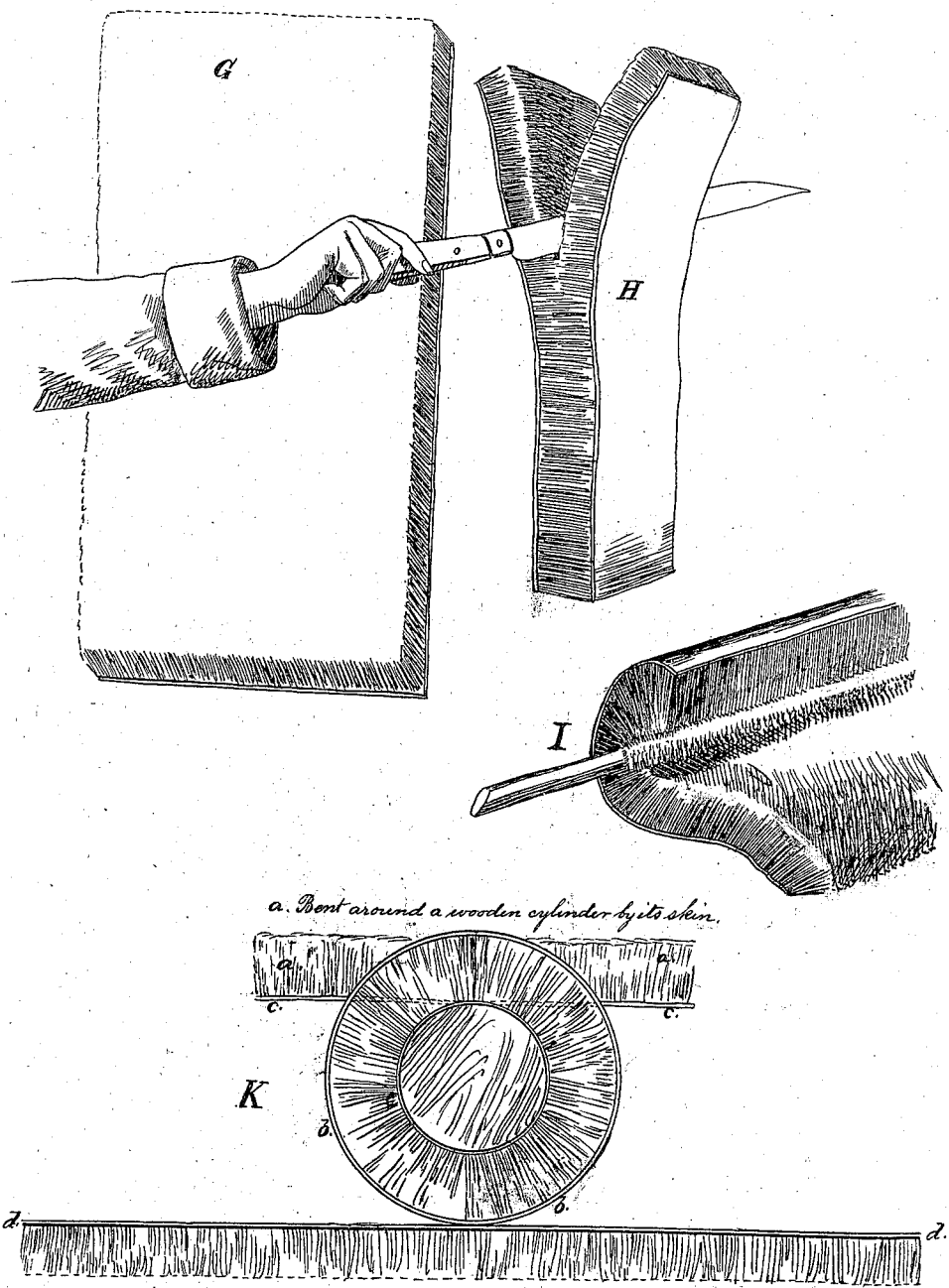

PETER BAUMGRAS, OF SYRACUSE, NEW YORK, ASSIGNOR TO HIMSELF AND CHAS. E. LIVINGSTON, OF UNITED STATES ARMY.

IMPROVEMENT IN THE MANUFACTURE OF VEGETABLE FUR, &c.

Specification forming part of Letters Patent No. 42,326, dated April 12, 1864.

*To all whom it may concern:*

Be it known that I, PETER BAUMGRAS, of Syracuse, in the State of New York, have invented a method of utilizing the seed spike or club of the *Typha latifolia*, commonly known as the "Cat's tail Flag," and thus rendering a hitherto useless article highly serviceable; and I do hereby declare the following to be one of the processes by which that effect is produced.

This process consists in forming from the downy substance in which the seed of the plant is embedded, and which in its natural state is closely packed around the central stalk, and constitutes the club or spike of the plant, a vegetable fur of a beautiful silky consistency, and which can be advantageously used for various purposes for which animal fur has heretofore been employed. To effect this purpose, after selecting these seed-spikes I brush off the brown pollen until the ends of the silken fibers are fully exposed. These spikes are then coated with a thin sheet of plastic india-rubber or some equivalent substance. Glue, gutta-percha or other vegetable gums may be used for this purpose; but I prefer india-rubber, which may be applied in a manner similar to that by which its application is made to felt for shoes and other like purposes. This may be backed by woven fabrics of silk or cotton or other like textile fabrics in order to give it the requisite strength.

To produce a more perfect result the club or spike may be prepared and given a more exact cylindrical shape by means of proper machinery; but this is not necessary to the successful application of the process. Either before or after the backing of the artificial skin by the woven fabric the spike may be laid open by a longitudinal incision, as shown in Figure B in the drawings. This may be done by a knife or other suitable instrument. The vegetable fur will readily separate from the central stem, around which it grew, and, being firmly attached to the artificial skin aforesaid, (see Fig. I,) it will resemble animal fur upon its natural skin. The rubber may then be vulcanized, or this vulcanization may take place at an earlier stage of the process. When thus prepared the fur presents a harsh feeling to the touch, owing to the fact that the seed-tufts stand with their stem ends outward, as represented at Fig. F. These tufts spring from a center and spread themselves out into twenty or more downy fibers, each of about equal length, as shown at Fig. D. All these are attached to the artificial skin by their outer extremities. By simply burning the now outer extremities of these tufts the fibers stand each independently and form the soft furry substance desired. This burning may be done by a smooth plate or other metallic surface heated to a sufficient degree, or the ends may be cut off by a sharp instrument. The fur thus prepared is capable of being bleached into perfect whiteness or of being dyed of any desirable color and made to resemble in consistency and appearance the most beautiful animal furs. If it is desirable to spread the fur over a larger surface, this is easily accomplished as follows: After separating what I term one "skin" of this fur from its stem it may be wrapped around a cylindrical surface of about the same diameter as the original "club," the artificial skin being placed inward. The fur will now stand with its harsh points outward, forming a cylinder of about double its former diameter, as shown at Fig. K. They will be found to spread themselves with great regularity. Another sheet of plastic rubber may now be applied to the present exterior surface of the cylinder, and then by separating the other extremities of these fibers from the first skin a skin of double size will be produced with the downy end soutward. This process may be still further continued, if desirable. In order to facilitate this operation the artificial skin first used may be made of some soluble substance, or the fur may be so arranged in some other way as to be easily detached from the first skin. It should be made to adhere closely to the last skin—that to which it is to be attached for use—and only slightly attached to any previous artificial skin. After this fur has been developed on its artificial skin, as above described, it may be laid on a flat surface, as shown at Fig. G. Another such skin may then be prepared and applied to the upper extremities of the fur. The whole may then be severed, as shown at Fig. H, so as to form two skins from one single seed-spike. In order to unite several of these small furry skins so as to form a larger one of any desirable size, I prepare them with each its temporary skin and lay them on a level surface with this temporary skin downward. They are then so trimmed in size as to completely cover the entire surface. I then prepare a sheet of plastic rubber sufficient to cover the upper surface of all these skins united and apply the same as above proposed, and back this up with the woven fabric above contemplated. The temporary skins upon the lower surface are then removed and the permanent skin duly vulcanized, when the whole will become one sheet of fur upon its artificial skin.

I am aware that the silky floral filaments of plants of the several species of the family "*Typha*" have been proposed to be used by Randall Creswell, in his English patent of 1857, for purposes similar to those contemplated by me, but in a manner that can never be of any practical utility. I do not therefore claim, broadly, the utilizing of that commodity for purposes herein contemplated; but What I do claim as new, and desire to secure by Letters Patent, is—

1. Making the seed-tufts of the *Typha latifolia* into vegetable fur upon an artificial skin by the process and in the manner which is substantially herein described.

2. Separating the downy fibers of the seed-spike of the *Typha latifolia* from its stalk or culm by attaching an artificial skin around its exterior surface and then detaching the seed-tufts, as above set forth.

3. Making two artificial skins of fur from one single spike in the manner above described.

4. Uniting two or more smaller skins to make one larger one, substantially as above shown.

5. Spreading the vegetable fur so as to be less dense and to occupy more space in the manner described.

PETER BAUMGRAS.

Witnesses:
R. T. CAMPBELL,
E. SHAFER.